Aug. 27, 1963   T. A. RICH   3,102,200
PENETRATING RADIATION MEASUREMENT BY IONIZATION
OF A PARTICLE BEARING AEROSOL
Filed May 29, 1959   3 Sheets-Sheet 1
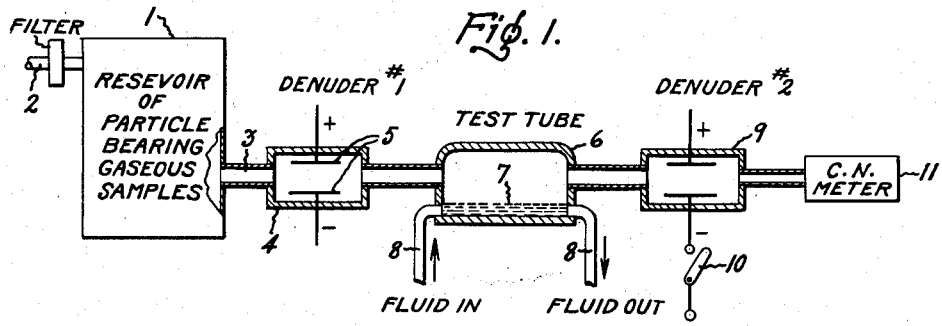
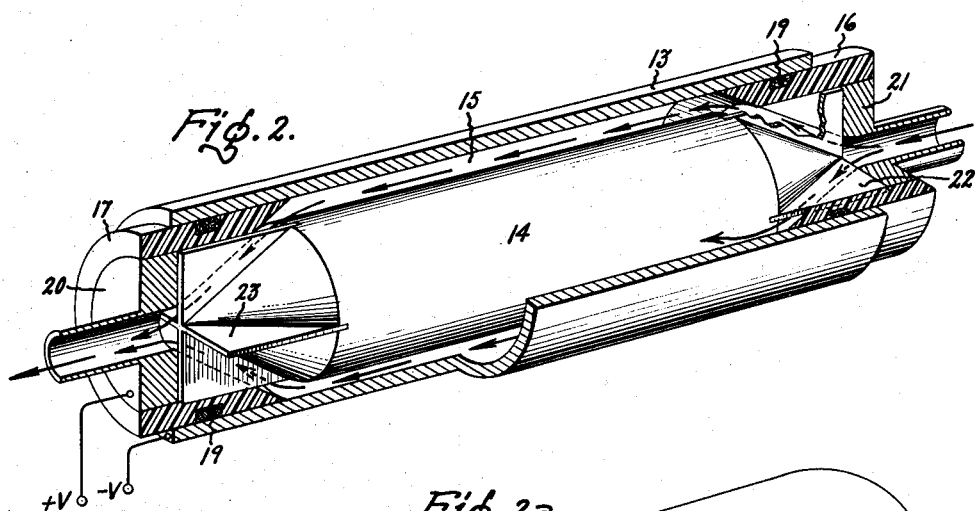
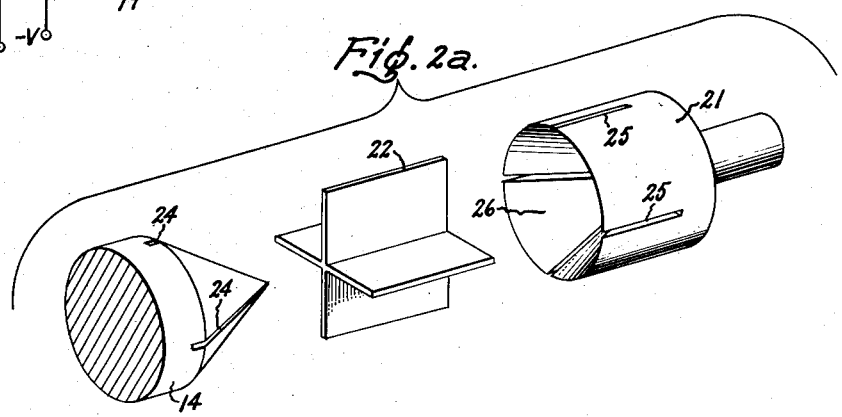
Inventor
Theodore A. Rich
by J. David Blumenfeld
His Attorney

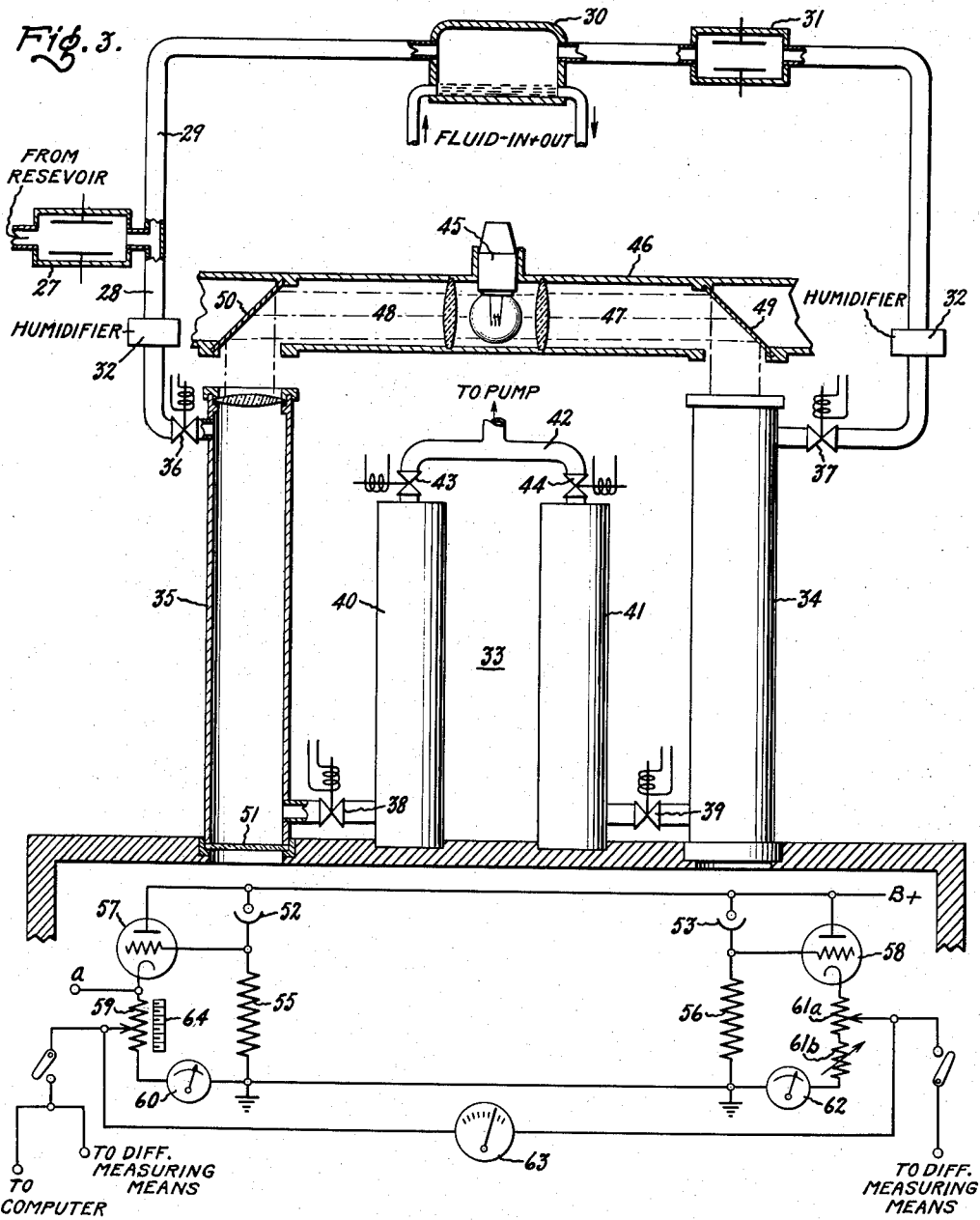

:::{.center}
United States Patent Office

3,102,200
Patented Aug. 27, 1963
:::

3,102,200
PENETRATING RADIATION MEASUREMENT BY IONIZATION OF A PARTICLE BEARING AEROSOL
Theodore A. Rich, Scotia, N.Y., assignor to General Electric Company, a corporation of New York
Filed May 29, 1959, Ser. No. 816,947
9 Claims. (Cl. 250—83.3)

This invention relates to a method and apparatus for detecting and measuring penetrating radiations.

In measuring penetrating radiation such as gamma rays, X-rays, alpha particles, beta particles, etc., by means of their ionizing properties, it is customary to expose a gaseous medium to the radiation and to measure the resulting ion current as an index of the radiation intensity. These ion currents, for values of radiation intensities frequently encountered, however, are of a very small magnitude, in the order of $10^{-14}$ amperes, and require special measuring circuitry to produce a perceptible indication. For example, special electrometer tubes having negligible grid current and specially fabricated high resistance elements of the order of $10^{11}$ ohms are required to measure the radiation induced ion currents. Furthermore, because the output currents of such ion chamber devices are so minute it is difficult if not impossible at all to measure low radiation intensities or small variations in the intensity levels. Hence, it is highly desirable to provide a radiation measuring instrumentality which has a higher sensitivity than presently known ion chamber devices. The purpose of this invention is to provide such an instrumentality.

It is an object of this invention, therefore, to provide a radiation measuring instrumentality which is highly sensitive, easy to manufacture, and rugged in construction;

A further object of this invention is to provide a radiation measuring instrumentality wherein the rate at which ionization equilibrium is achieved in an aerosol particle bearing gaseous medium is utilized as a measure of the radiation intensity;

Still another object of this invention is to provide a radiation measuring instrumentality wherein the aerosol particle concentration in a gaseous medium is reduced as a function of the radiation intensity;

Other objects and advantages of this invention will become apparent as the description thereof proceeds.

In accordance with one of its aspects, the invention comprises a radiation sensing and measuring device wherein an aerosol particle bearing gaseous sample of a known concentration is exposed to the radiation to be measured so that the aerosol particles are charged by the ionizing effect of the radiation to an extent determined by the intensity of the radiation. The charged aerosol particle fraction is removed by passing the sample through an electric field and the change in aerosol particle concentration is measured as an indication of the radiation intensity.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIGURE 1 is a schematic illustration of the radiation measuring instrumentality of the instant invention;

FIGURES 2 and 2a show a portion of the instrument of FIGURE 1 in perspective;

FIGURE 3 is an alternative construction of a radiation measuring instrument;

Figure 4:
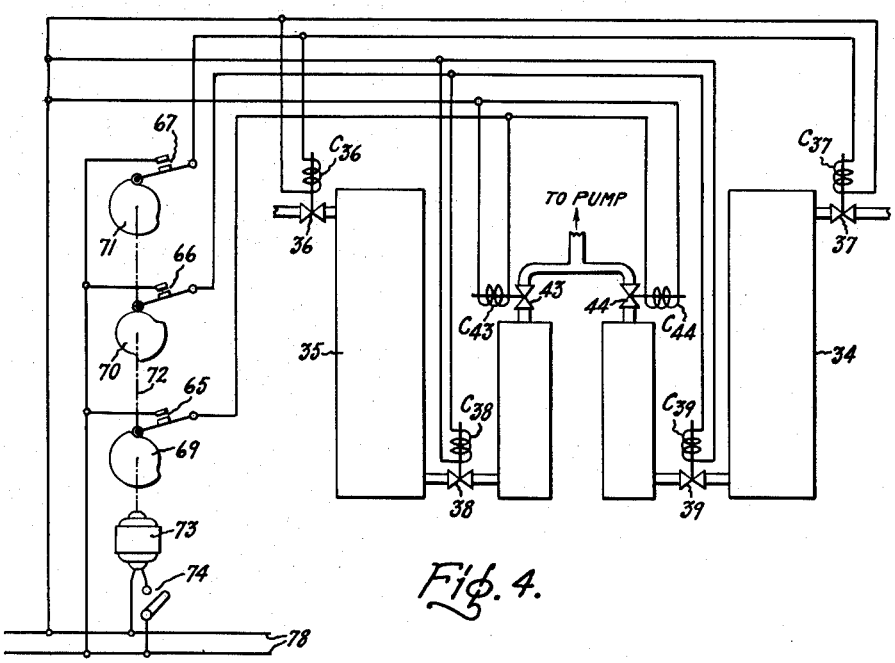
FIGURE 4 is a wiring diagram illustrating the manner in which the solenoid valves of the instruments of FIGURE 3 are controlled.

Referring now to the drawings, FIGURE 1 shows one embodiment of a radiation measuring instrument constructed in accordance with the invention wherein aerosol particle bearing gaseous samples are supplied from a particle source such as the chamber or reservoir 1. The chamber 1 contains a La Mer aerosol particle generator such as is disclosed in an article by Victor K. La Mer, entitled "The Preparation, Collection, and Measurement of Aerosols," appearing on pages 607–616 of the Proceedings of the United States Technical Conference on Air Pollution, published by the McGraw-Hill Book Company, 1952, or the like which, as is well known to those skilled in the art, produces an aerosol particle concentration of substantially constant size aerosol particles. A filtered gaseous medium such as air, for example, is brought into the chamber 1 through an inlet conduit 2 and withdrawn with the aerosol particles entrained therein through an outlet conduit 3.

In order to remove aerosol particles which are already charged due to natural phenomena such as cosmic rays, natural radioactivity, etc., the sample is brought into a chamber 4 and passed between a pair of electrodes 5 energized to establish an electric field between the electrodes. The charged aerosol particles in passing through the electric field between the electrodes are drawn to the electrodes and removed from the gas. Because of this characteristic action such a device is referred to as a "denuder" in that it strips or denudes the sample of charged aerosol particles, and subsequent references thereto in this specification will, as a matter of convenience, be as a denuder.

The gaseous sample after treatment in denuder 4 is brought to a test chamber 6 where it is exposed to a source of ionizing radiation the intensity of which is to be measured. The test chamber 6 illustrated in FIGURE 1 is particularly useful in monitoring the radioactivity of a fluid 7 which circulates in the chamber through the conduits 8. It is to be understood, however, that the instant invention is not limited to monitoring a fluid by means of a cell arrangement such as that shown in FIGURE 1 but that the gaseous samples having the entrained aerosol particles and the test chamber may be exposed directly to an external source of radiation which penetrates the walls and acts on the sample in the chamber.

In passing through the test chamber the carrier gas is ionized to a degree determined by the intensity of the radiation and some of the ionized gas molecules attach themselves to and charge some of the aerosol particles. The gaseous sample is again passed through an electric field in a second denuder 9 to remove the charged aerosol particles. The denuder 9 includes a pair of electrodes which are energized, through a switch 10, from a suitable source of energizing voltage, not shown, to establish the electric field. The switch 10 is included to facilitate selective measurement of the aerosol particle concentration with and without an electric field to establish both the total aerosol particle concentration in a sample as well as the concentration with the charged aerosol particles are removed so that the fraction of the total aerosol particle concentration charged in transit through the radiation test chamber 6 may be determined.

To this latter end, a means for measuring the aerosol particle concentration is coupled to the output of the denuder 9 so that the intensity of the radiation may be determined. Thus an aerosol particle measuring device 11 of the condensation nuclei type is illustrated in block diagram form and may be of the character described and illustrated in U.S. Patent No. 2,791,901, entitled "Apparatus for Measuring Condensation Nuclei," issued to T. A. Rich on May 14, 1957, or alternately a device such as that described in U.S. Patent No. 2,684,008, entitled "Method and Apparatus for Measuring the Concentration of Condensation Nuclei," issued to B. Vonnegut on July 20, 1954. The devices disclosed in these patents measure the aerosol particle concentration by humidifying the gaseous sample to bring it to 100 percent relative humidity, subjecting the humidified sample to an adiabatic expansion to form droplets about the aerosol particles, as centers, and measuring the density of the droplet cloud as an indication of the particle concentration.

In operation, an aerosol particle bearing gaseous sample is drawn from the chamber 1 by means of a pump, not shown, which is an integral component of the condensation nuclei meter 11. The sample flows through the denuder 4 which is continually energized and charged aerosol particles due to naturally occurring ionizing events such as natural radioactivity or cosmic rays are removed. Of the remaining aerosol particles, a fraction is charged in transit through the test chamber 6 by the attachment of ionized gas molecules produced by the radiation. Since the number of such ions in the chamber in a given period of time depends on the intensity of the radiation, the number of aerosol particles charged in transit similarly depends on the radiation intensity.

The aerosol particle concentration is then measured first with the energizing switch 10 open so that the total aerosol particle concentration in the sample is measured. The switch 10 is then closed and the aerosol particle concentration is measured with the charged aerosol particles removed. The difference in concentration with the switch 10 open and closed is a measure of the aerosol particles charged in the test chamber and hence of the radiation intensity.

The denuder construction, illustrated schematically in FIGURE 1, is shown in detail in FIGURES 2 and 2a and include two concentric cylindrical electrodes 13 and 14 which define an annular passage 15 through which the particle bearing gaseous medium passes. A pair of insulating sleeves 16 and 17 separate the electrodes and the whole assembly is sealed against leakage by means of O-ring seals 19. A radial electric field is established across the annular passage 15 by applying energizing voltages +V and −V to the two electrodes so that the charged aerosol particles are drawn to the electrodes and removed.

The central electrode 14 is supported in the manner illustrated in FIGURE 2a which shows an exploded view of the electrode support assembly. Thus it may be seen that electrode 14 is supported in cone shaped receptacles 26 in the end plugs 20 and 21, one of which is shown in FIG. 2a, and are supported therein by means of cross-shaped support members 22 and 23, only one of which is shown in FIG. 2a, which fit into retaining slots 24 in electrode 14 and corresponding retaining slots 25 in the end plugs. In this manner a simple and effective apparatus for removing the charged particles from the gaseous medium is provided although it will be apparent that other denuder configurations may obviously be used in carrying out the instant invention.

For some purposes, particularly where the system is to be utilized in an automatic recording and monitoring system or where the radiation intensity is fluctuating rapidly, the radiation instrument of the instant invention may be so constructed that the measurement of the total aerosol particle number and the uncharged aerosol particle fraction is carried out simultaneously. FIGURE 3 illustrates such an alternative construction wherein the particle bearing gaseous sample from a reservoir, not shown in FIGURE 3, is brought through a first denuder 27 to remove all naturally charged aerosol particles. The denuder 27 which contains a pair of electrodes to establish an electric field, is one of the type illustrated in FIGURES 2 and 2a and the description thereof need not be repeated here.

The gaseous sample after passing through the denuder 27 is divided in the conduits 28 and 29 and one portion is exposed to the radiation in chamber 30 while the other portion is not so exposed. A second denuding element 31 is positioned at the outlet of the test chamber and subjects the sample to an electric field in the manner previously described to reduce the aerosol particle concentration by a predetermined fraction. The sample portion in both conduit 28 and conduit 29 are humidified in the humidifying elements 32 to bring both to 100 percent relative humidity before applying them to a novel condensation nuclei measuring device wherein the aerosol particle concentrations of both are determined simultaneously.

This condensation nuclei measuring device illustrated generally at 33 includes a pair of expansion chambers 34 and 35 which are adapted to receive the respective sample portions and are coupled to the conduits 28 and 29 through a pair of solenoid control valves 36 and 37. The expansion chambers 34 and 35 are in turn coupled through a pair of solenoid control valves 38 and 39, to the vacuum chambers 40 and 41 which are periodically evacuated by a pump. The pump, not shown, is coupled to the vacuum chambers through a branch conduit 42 and the solenoid control valves 43 and 44.

The solenoid valves 36, 37, 38, 39, 43, and 44 are operated in a predetermined sequence so that the respective particle bearing samples in the conduits 28 and 29 are admitted into respective expansion chambers 34 and 35 and then expanded into the vacuum chambers to condense water vapor and form droplets about the aerosol particles. The density of the droplet clouds is measured by the attenuating affect they have on two radiant energy beams traversing the chambers 34 and 35. A single light source such as the incandescent bulb 45, is mounted in a housing 46 positioned above the chambers and projects two light beams 47 and 48 onto a pair of 45 degree reflecting mirrors 49 and 50. The light beams are reflected into the expansion chambers 34 and 35, traversing the lengths thereof, and pass out through a light transparent sealing member 51 onto two radiation sensitive elements such as the photodevices 52 and 53. As a result, the appearance of droplet clouds in the chambers 34 and 35 attenuates the light beams to an extent determined by the number of droplets in the chamber and hence of the particle concentration.

The attenuated beams intercepted by the photosensitive devices 52 and 53 produce an electrical output signal proportional to the intensity of the attenuated beam, which signal is utilized to produce an indication of the particle concentration. To this end, the anodes of the photodevices 52 and 53, which are of the photoemissive type, are connected to the positive terminal B+ of a source of energizing voltage and the photosensitive cathodes are in series with resistances 55 and 56 which are connected in the grid circuits of space discharge devices 57 and 58. The light beams impinging on the photoemissive cathodes of devices 52 and 53 produce electron current flow through resistances 55 and 56 which is proportional to the light intensity. The voltage drop due to this current flow produces a variable grid bias for tubes 57 and 58 which in turn controls the current flow through the triodes 57 and 58. As a result, the current flowing in the two triodes in response to the output signal from the photosensitive devices 52 and 53 is proportional to the droplet density in the chambers and is measured to produce an indication of the particle concentration.

To measure the relative magnitude of these currents, the cathodes of tubes 57 and 58 are connected to ground through the cathode resistors 59, 61a, 61b and the ammeters 60 and 62 so that the ammeters measure the respective currents and may be calibrated directly in terms of particle concentration. A null balancing instrument such as the galvanometer 63 is connected between the cathode resistor 61a of the triode 58 and a movable tap on the cathode resistance 59 to provide an indication of the differential voltage drop across resistances 59 and 61 which is a measure of the difference in the particle concentration of the two sample portions.

Photodevices 52 and 53 and their associated circuits are so constructed and arranged that an accurate indication is provided both of the absolute values of the particle concentration in the individual chambers as well as the difference in concentration. To achieve this result the devices are initially calibrated by admitting reference samples from which all particles have been removed by filtering into chambers 34 and 35 and setting the slider on resistance 59 at a tap a and adjusting the intensity of the light output from bulb 45 so that the ammeter 60 reads full scale (i.e. no attenuation of the beam). Resistance 61b is then varied until ammeter 62 also reads at full scale and the slider position on resistance 61a is adjusted so that galvanometer 63 reads zero.

During measuring operations the untreated and the treated sample portions, the latter with the charged fraction removed, are introduced into their respective chambers and the currents in triodes 57 and 58 are measured by individual ammeters 60 and 62 which are calibrated to read directly in particle concentrations. The movable slider of potentiometer resistance 59 is adjusted until the galvanometer 63 again reads zero and the new balance position of the slider is a measure of the difference $(N_1-N_2)$ in particle concentration. The resistance 59 is provided with a scale 64 calibrated directly in terms of this difference in concentrations.

The uncharged particle fraction may then be obtained from the ratio of this value $(N_1-N_2)$ and the total number of particles $N_1$ in the sample as indicated by the ammeter 60. It will be apparent, of course, that to produce an automatic indication, the voltages at the cathode of the tube 58, proportional to $N_2$, i.e. $[V_{61}=K(1-BN_2^{1/3})]$, and at the slider on resistance 59, proportional to $N_1$, i.e. $[V_{59}=K(1-BN_1^{1/3})]$, may be applied to a differential measuring means to produce a voltage which is proportional to $(N_1-N_2)$. The output from the differential measuring means is then applied along with the voltage at slider 59 to a computer to produce an output proportional to the ratio $$\frac{N_1-N_2}{N_2}$$

In operation, the instant invention functions as follows: valves 36, 37, 38, 39, 43 and 44 are opened and the pump flushes out the chambers and draws in fresh humidified samples. Valves 38 and 39 then close isolating the vacuum chambers 40 and 41 from their respective expansion chambers permitting the pump to evacuate these chambers. The valves 43, 44, 36 and 37 are closed and the entire system is permitted to come to thermal equilibrium. The valves 38 and 39 are opened and the samples expand into the vacuum chambers so that the pressure in the chambers 34 and 35 falls very rapidly since the gaseous samples in the expansion chambers 34 and 35 must now also occupy the vacuum chambers. The sudden expansion of the humidified gaseous samples in the chambers 34 and 35 produces an unstable supersaturated condition and water vapor condenses about the particles forming a cloud of droplets in both chambers, the density of which is proportional to the particle concentration. The expansion is limited so that it does not read the small ions but only the particles.

The formation of these droplet clouds attenuates the light beams traversing these chambers by an amount proportional to the droplet cloud density and the respective photodevices 52 and 53 produce a corresponding current flow through grid leak resistances 55 and 56 which control the current in triodes 57 and 58. By manipulating the slider on resistance 59 to produce a null indication on galvanometer 63, the number of charged particles $(N_1-N_2)$ removed by the denuder may be obtained and the charged fraction determined as a measure of the radiation intensity.

Referring now to FIGURE 4 there is illustrated a valve control circuit diagram for the solenoid valves of FIGURE 3, in which corresponding parts have been given corresponding numerals. Thus the individual solenoid valves 36, 37, 38, 39, 43 and 44 which control the communication between the various chambers and the pump are actuated by energizing their solenoid coils in the proper sequence. Each of the solenoid coils $C_{36}$, $C_{37}$, $C_{38}$, $C_{39}$, $C_{43}$, and $C_{44}$ has one side thereof permanently connected to one side of a 117 volt line shown at 78 and the other side connected periodically and in a predetermined time sequence, through cam operated snap switches 65, 66 and 67, to the other side of a 117 volt line. Each of the switches 65, 66 and 67 controls the energization of one solenoid coil pair and are actuated by cams 69, 70 and 71. The cams 69-71 are mounted on a common shaft 72 and driven by a low speed motor 73, such as a 1 r.p.m. KYC-23, Bodine motor manufactured by the Bodine Electric Company, Chicago, Illinois, for example, which is energized from the 117 volt A.-C. power line 68 through the switch 74.

Figure 5:
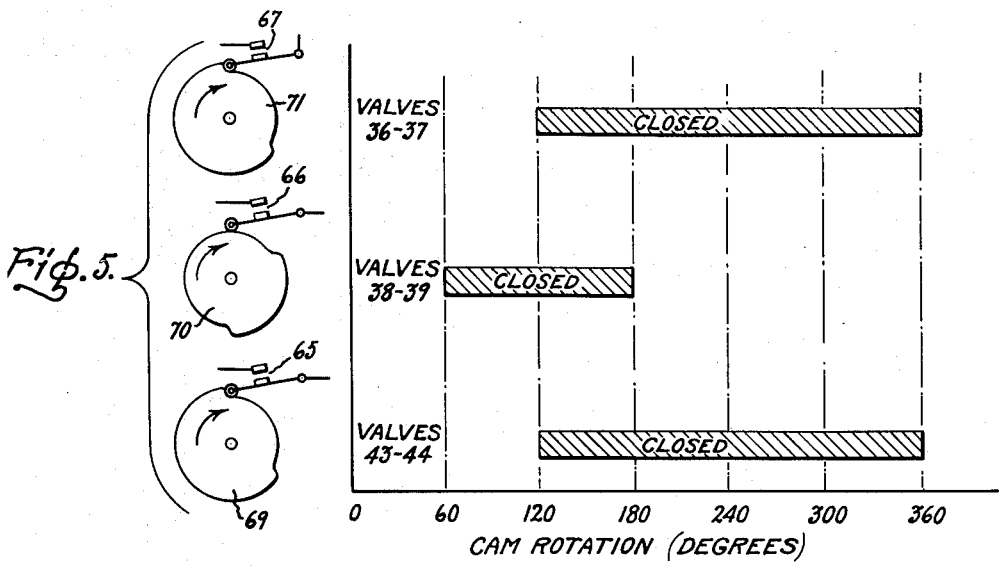
FIGURE 5 is a graphical illustration of the operational cycle of the valves of FIGURE 4.

The cams 69, 70 and 71 are so constructed, as may be seen most clearly in FIGURE 5, that the switches 65, 66 and 67 are closed to energize the solenoid coils and actuate the valves in a time sequence and for a duration such as shown by the graph of FIGURE 5. In FIGURE 5 the rotational cycle of the cam in the degrees is illustrated along the abscissa and the closure of the switches and hence the energization of their associated solenoid and valves is illustrated by means of the cross-hatched portion. Thus it can be seen that the cam surface on the cam 69 extends for approximately 240 degrees of its circumference so that the coils $C_{43}$ and $C_{44}$ are energized from 120 degrees to 360 degrees during each operational cycle closing the valves 43 and 44. The cam surface of the cam 71 is identical to cam 69 in construction and operation so that the coils $C_{36}$, $C_{37}$, switch 67, and the valves 36 and 37 have the same operational cycle as those associated with cam 69. The cam surface of cam 70, on the other hand, extends only for approximately 120 degrees and is so spaced with respect to the others that the operational sequence of the solenoid valves is that shown graphically in FIGURE 5 to provide the operating cycle described above.

It will be apparent of course to those skilled in the art that other means for controlling the solenoid valves in the proper sequence may be utilized without going outside of the scope of the invention and the circuit diagram of FIGURE 4 is intended to be illustrative only.

While a particular embodiment of this invention has been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a radiation measuring instrument, the combination comprising means to provide a gaseous sample containing uncharged aerosol particles only, means to subject the uncharged aerosol particle bearing gaseous sample to ionizing radiation to charge a fraction of the aerosol particles therein, and means responsive to both charged and uncharged aerosol particles to determine the fraction of aerosol particles thus charged as an index of the radiation intensity.

2. In a radiation measuring device, the combination comprising a source of aerosol particle bearing gaseous samples, means to treat said gas entrained aerosol particles to remove all naturally charged aerosol particles, means to subject such samples to the radiation to be measured to charge a fraction of the aersol particles therein, and means responsive to both the charged and uncharged aerosol particles to determine the fraction charged due to exposure to the radiation as an index of the radiation intensity.

3. In a radiation measuring device, the combination comprising means to provide a gaseous sample containing a quantity of uncharged aerosol particles entrained therein, means to subject such sample to ionizing radiation so that the number of aerosol particles charged is a function of the intensity of said radiation, and means responsive to both the charged and uncharged aerosol particles to determine the aerosol particles thus charged as an index of the radiation intensity.

4. In a radiation measuring device, the combination comprising means to provide a gaseous sample containing a number of uncharged entrained aerosol particles, means to irradiate said sample to charge a fraction of said gas entrained aerosol particles, means for removing the charged aerosol particles from said sample, and means to measure the remaining aerosol particle concentration to thereby determine the radiation intensity from the change in aerosol particle concentration before and after removal of the charged aerosol particles.

5. In a radiation measuring device the combination comprising means to provide a gaseous sample having a number of aerosol particles entrained therein, means to irradiate a portion of said sample to charge a fraction of the aerosol particles in said irradiated portion, means to reduce the aerosol particle concentration in said irradiated portion including means to produce an electric field through which said irradiated portion passes to remove the charged fraction of the aerosol particles, and means comprising a condensation nuclei meter to measure the aerosol particle concentration both in the irradiated and remaining portions of the sample to determine the radiation intensity therefrom.

6. In a radiation measuring device, the combination comprising means to provide a gaseous sample having a given concentration of aerosol particles entrained therein, means to irradiate a portion of said samples to charge the aerosol particles to an extent related to the intensity of said radiation, means to reduce the aerosol particle concentration in said irradiated portion including means to produce an electric field to remove said charged aerosol particles, and means to subject said irradiated portion and the remaining portion of said gaseous sample to an adiabatic expansion to produce droplet clouds the density of which is a measure of the aerosol particle concentration, said means comprising a pair of chambers adapted to receive the two portions of the gaseous sample, means to subject said samples simultaneously to an adiabatic expansion in said chambers to produce droplet clouds upon the particles in said samples, and means to measure the densities of the respective droplet clouds as an index of the relative particle concentrations.

7. In a device for measuring the aerosol particle concentrations in gaseous samples, the combination comprising means defining a pair of chambers adapted to receive individual gaseous samples, means to subject said samples simultaneously to an adiabatic expansion in said chambers to produce droplet clouds about the aerosol particles in said samples, and means to measure the densities of the respective droplet clouds as an index of the relative aerosol particle concentrations.

8. In a differential particle measuring device for measuring the difference in concentration of gas entrained aerosol particles, the combination comprising means defining a pair of chambers adapted to receive individual humidified gaseous samples containing said aerosol particles, means for simultaneously expanding said samples adiabatically to form droplet clouds in said chambers about the aerosol particles as centers, electro-optical means to measure the density of said clouds and produce an electrical signal representative thereof, and means to compare said signals to provide an index of the aerosol particle concentration difference in said samples.

9. The combination set forth in claim 4 further characterized by means to treat the gaseous sample prior to irradiation to remove all naturally charged particles entrained in said sample.

References Cited in the file of this patent

UNITED STATES PATENTS

| 2,624,012 | English | Dec. 30, 1952 |
| 2,627,543 | Obermaier | Feb. 3, 1953 |
| 2,684,008 | Vounegut | July 20, 1954 |
| 2,761,975 | Weisz | Sept. 4, 1956 |
| 2,774,652 | Vounegut | Dec. 18, 1956 |
| 2,791,901 | Rich | May 14, 1957 |
| 2,985,758 | Bosch | May 23, 1961 |
| 2,994,768 | Derfler | Aug. 1, 1961 |

OTHER REFERENCES

Physical Review, vol. 100, No. 6, Dec. 15, 1955, pages 1755 to 1762.

Vapor Phase Chromatography, by Desty, Butterworths Scientific Publication, London, 1957, pages 169 to 184.

Continuous Air Monitor for $H^3$, by Brinkerhoff et al., Nucleonics, vol. 17, No. 2, February 1959, pages 76, 78 and 81.